May 23, 1972          G. P. STROPKAY          3,664,698
ELECTRIC ACTUATING MECHANISM
Filed April 2, 1970
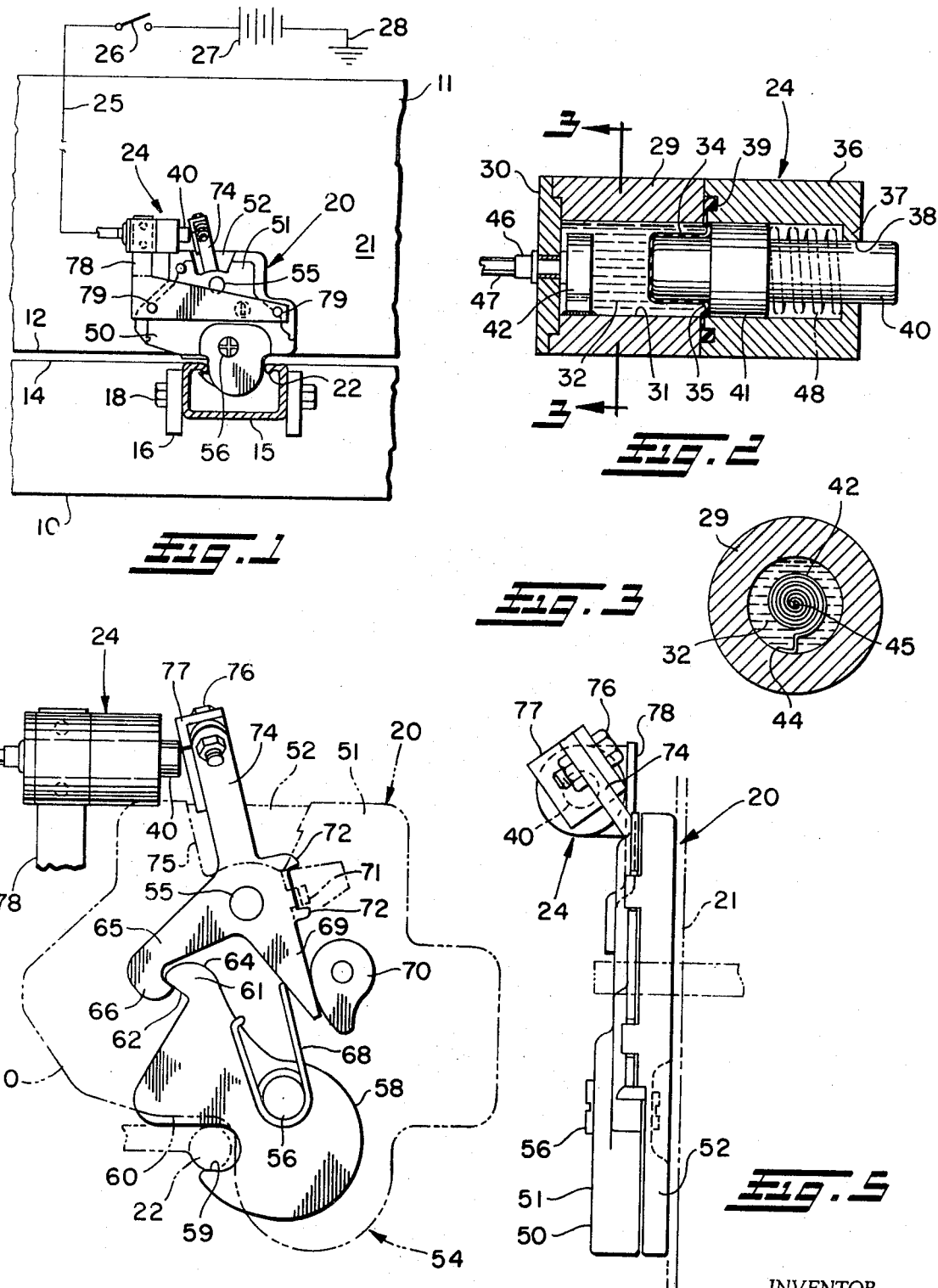
INVENTOR.
GEORGE P. STROPKAY
BY
Oberlin, Maky, Donnelly & Renner
ATTORNEYS

United States Patent Office 3,664,698
Patented May 23, 1972

3,664,698
ELECTRIC ACTUATING MECHANISM
George P. Stropkay, Willoughby, Ohio, assignor to Product Design & Manufacturing Corp., Willoughby, Ohio
Filed Apr. 2, 1970, Ser. No. 25,175
Int. Cl. E05c 3/26, 13/00
U.S. Cl. 292—201                         6 Claims

ABSTRACT OF THE DISCLOSURE

Electrically operated automobile latch mechanisms utilizing a linear actuator which develops operating force by the vaporization of Freon 113. The actuator includes a sealed chamber having a flexible annularly folded diaphragm which imparts movement to a linearly guided plunger, the Freon being contained in the chamber together with a coiled resistance heater element which is remotely energized from the automobile power source.

---

This invention relates generally to linear actuator devices and more particularly to an automobile trunk latch mechanism incorporating a linear actuator which operates on the principle of vaporization of a low boiling point fluid by an electrical power source.

While the advantages of operating various portions of an automobile or any other form of apparatus from a remote location are readily apparent in providing convenience of operation, great design flexibility, and in certain instances a safety interlock, no great attention has been directed in the past to providing such conveniences other than by the well-known solenoid actuated or motor driven devices.

These magnetic type devices, while being highly refined, are subject to certain inherent deficiencies including a relatively high cost of manufacture for winding a solenoid or a motor armature and the like; a performance characteristic which must be designed around, i.e. a relatively low force output until the magnetization gap is partially closed or the motor attains a nominal speed of operation; and the reliability drawbacks wherein relatively high speeds of operation as in the case of motors or the ability to withstand impact forces as in the case of solenoid devices must be accommodated.

In the instant invention, it is desired to provide an automobile latch mechanism which is electrically energized and operable from a remote location as a convenience to the operator of the vehicle and to provide the safety features and design flexibilities possible with such devices. The apparatus of the instant invention satisfies much of this criteria in a latch which is significantly lower in cost, and of superior performance and reliability over known solenoid or motor actuated devices.

The teachings of the instant invention are applicable to other vehicle devices, as well. For example, the latch for a seat back may be actuated automatically by the opening of the vehicle door, as by a simple limit switch, to allow ready access to the interior. In this application an additional benefit over known devices is obtained in that due to the inherent time delay of the actuator the seat back latch is maintained for an interval, during a collision, for example, before actual release occurs, while still being sufficiently responsive for normal passenger use. Other applications for the invention reside in controlling headlamp covers, engine hood latches, door latches and the like and the variations in force output, stroke, operating speed and similar design criteria of the actuator may be advantageously employed for each specific application. Further, most devices are designed for manual operation as well, both as a back-up and convenience measure, and the utilization of the instant invention in these embodiments requires no compromise in performance and design.

Therefore it is one object of this invention to provide an improved actuator device in application with mechanisms which can accommodate a linear actuating stroke. It is another object of this invention to provide improved automotive latch mechanism which are operable from a remote location utilizing the advantages of the expansion of a low boiling point fluid.

It is yet another object of this invention to provide an improved trunk latch mechanism which is electrically operated and which provides improvements in cost, performance, reliability and efficiency over other known devices.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

In the drawings:

FIG. 1 is an environmental view of the apparatus of the invention in location in the interior of an automobile trunk;

FIG. 2 is a cross-sectional view of the actuator portion of the invention;

FIG. 3 is a cross-sectional view of the actuator taken along the lines 3—3 of FIG. 2.

FIG. 4 is an elevational view of the apparatus of the invention with parts removed for purposes of clarity; and FIG. 5 is an end view of the apparatus of the invention.

Referring now to FIG. 1 and the environmental view of the invention, there is shown a portion of the shell 10 of an automobile body forming a lower panel of a truck enclosure together with a portion of a trunk lid 11 which is adapted, in the conventional manner, for pivotal movement toward and away from the body shell 10 so that in a closed position the lower edge 12 of the trunk lid 11 is closely adjacent the top edge 14 of the shell 10. A keeper 15 is adjustably mounted on the body shell 10, by way of brackets 16 and bolts 18, closely adjacent the top edge 14 for engagement with the latch mechanism 20 which is mounted in vertical alignment with the keeper 15 on an inner panel surface 21 in the interior of the trunk lid 11.

The keeper 15 and latch mechanism 20 are essentially of conventional construction, the former comprising a formed metal part of generally box-like configuration having a pair of rolled edges 22 at the top portion thereof for guiding the latch mechanism 20 into proper position and for engagement with an operative portion of the latch for maintaining the trunk lid 11 in the closed position. Shown as a part of the latch mechanism 20 is the actuator 24 which receives energizing power by way of conductive wire 25, remotely located switch 26, and the automobile battery 27, the latter having ground connection 28.

Referring now to FIG. 2 and the cross-sectional view of the actuator 24, there is shown a cylindrical housing 29 having an enclosing end wall 30, both preferably of metal and welded together to form a part of the sealed chamber 31 which contains the fluid 32 for providing actuation. Extending across and in sealing engagement with the open end of the container 29 is a flexible, generally circular diaphragm 34 preferably of rubber but conveniently of any material which provides sufficient resiliency while hermetically sealing the chamber 31. In FIG. 2, the diaphragm 34, having an annular fold 35, is shown in folded back condition but is adapted upon a build up of pressure within the chamber 31 to be distended outwardly to the right from the container 29.

The actuator 24 further includes a second cylindrical housing 36 having an end wall 37 with aperture 38 to provide a bearing surface, the open end of the housing 36 having a notch 39 to receive the periphery of the diaphragm 34 and being welded to housing 29. Located within the second housing 36 is a cylindrical plunger 40 engaging diaphragm 34 and having a stepped portion 41 adapted to slidingly engage the internal periphery of the housing 36. The plunger 40 extends through the aperture 38 in the end wall 37 for transmission of the motion of the diaphragm 34 to devices exterior of the hosuing 36, and is adapted for sliding engagement in the end wall 37 which may be of any desired thickness to provide a suitable bearing surface.

Located within the sealed chamber 31 and mounted on the end wall 30 of the housing 29 is an electrical resistance heater 42 which preferably is of the coiled element type having one end 44 of the element welded to and in electrical connection with the housing 29 and the other end 45, which is at the center of the element, electrically connected to a terminal 46 which is insulatively and sealingly mounted in the end wall 30. The terminal 46 is an electrical conductor passing through the end wall 30 and is connected in turn to wire 47 for receiving power from the automobile battery 27, the housing 29 completing the circuit to the heater element 42, in being grounded to the automobile body, connected to ground 28. Completing the actuator 24, a sufficient quantity of Freon or other low boiling point fluid 32 is located within the sealed chamber, such fluid 32 occupying substantially the full volume of the chamber 31, which is only on the order of four to five cubic centimeters.

The actuator 24 of the preferred embodiment approximately 1⅛ inches in diameter and approximately 1½ inches in overall length, each of the housings 29, 36 occupying approximately ½ the total length. Preferably the fluid 32 utilized in this apparatus is Freon 113, which is a type of fluorinated hydrocarbon having a relatively low boiling point of approximately 118° F. at one atmosphere pressure and is nonflammable in the gaseous state. However, other types of fluid may be utilized which are readily vaporized at a suitable low power input level which in this embodiment is approximately 120 watts, providing an 8 pound force output in ¼ inch plunger displacement, attained on the order of less than one second. While the transition from the liquid to the vapor state and the reverse provides a build-up of pressure and a partial vacuum in the sealed chamber 31 to effect distension and collapse of the flexible diaphragm 34, it will be understood that the plunger 40 may receive a bias by way of the latch mechanism 20 or a spring 48 acting to the left as viewed in FIG. 2 to aid in the collapse of the diaphragm 34 or to prevent its movement at elevated temperatures. As shown in FIG. 2, compression spring 48 may be mounted in housing 36, acting between end wall 37 and stepped portion 41 of plunger 40.

The latch mechanism 20 is shown in detail in FIGS. 4 and 5 and comprises a stamped metal casing 50 formed of upper and lower enclosures 51, 52 which are secured together by a plurality of folded metal tabs 53. The casing 50 includes a tongue 54 at the lower portion thereof which is adapted to enter between the rolled edges 22 of the keeper 15 to partially aid in guiding the trunk lid 11 to the proper location. First and second pins 55, 56 are located in the casing 50 for mounting of the components of the latch mechanism, such pins being of sufficient length to pass through the upper and lower enclosure members 51, 52 and are swaged into a fixed position.

Pivotally mounted on the lower pin 56 is the latch member 58 which includes a notch 59 at the lower portion thereof for engaging one of the rolled edges 22 of the keeper 15, being cammed into the position depicted in FIG. 3 by the downward movement of the trunk lid 11 and the action of one rolled edge 22 upon the tapered lip 60 of the latch member. The latch member 58 further includes a lip 61 at the upper portion thereof having a lower flat surface 62 and a contoured upper surface 64 for cooperation with the catch member 65. Thus in engaging the keeper 15, the latch member 58 is rotated in a clockwise direction to that position depicted in FIG. 3 wherein the notch 59 engages the rolled surface 22 and retains the latch mechanism 20 and therefore the trunk lid 11 in a locked condition.

The catch member 65 is also a metal stamping pivotally mounted on the upper pin 55, including a first arm having a lip 66 thereon with a flat upper surface and contoured lower surface which is adapted for engagement with the latch member 58. In closing the trunk lid 11, the contoured surface 64 of the latch member 58 initially engages the contoured surface of the catch member 65 and urges the latter in a clockwise direction until the flat surfaces of the members slip into engagement. A torsion spring 68 is mounted on the lower pin 56 having legs engaging the latch member 58 and an actuating arm 69 on the catch member 65 to urge both members in a counterclockwise direction, so that the flat surfaces on lip 61, 66 become fully engaged creating a locking condition for the latch member 58.

A manually operated actuating cam 70 accessible from outside the casing 50 by way of the tumbler mechanism (not shown) is mounted for rotation and is adapted to engage the release arm 69 of the catch member 65 to urge the latter in a clockwise direction for release of the latch member 58. A tab 71 formed in the lower housing of the casing 50 cooperates with a pair of stop dogs 72 formed on the catch member 65 to restrict the movement of the latter.

A second manually operable actuating arm 74 for the catch member 65 extends upwardly of the casing 50 through an aperture 75 and has secured thereto by bolt 76 an L-shaped bracket 77 adapted to be abutted by the plunger 40 of the actuator 24. A mounting plate 78 is secured to the casing 50 by means of the latch mechanism mounting bolts 79, and the actuator 24 in turn is secured to the mounting plate 78 so as to lie in alignment with the adapter 77. It will be clear therefore that linear movement of the actuator plunger 40 will cause a clockwise rotation of the catch member 65 an thus disengagement of the flat surfaces to allow the latch member 58 to be released from the keeper 15, the latch member 58 being aided in its counterclockwise rotation by the action of the torsion spring 68. It will be clear also that the actuator 24 gives impetus to the catch member 65 against the bias of the same torsion spring 68 so that the plunger 40 of the actuator 24 is biased to the left as viewed in FIG. 4.

As previously indicated, the actuator 24 is energized from the power source 27 of the automobile by way of a switch 26 which may be a push button switch of the momentary closure type which effects a completed circuit through the coil of the heater element 42, to the chassis or frame of the vehicle which acts as a common ground connection. While the actuation of the actuator 24 is limited to some extent by the time required to bring the fluid 32 within the sealed chamber 31 to the vaporization point and the time required to cool to a liquid again, it will be apparent that actuating time is a function of the energy applied by way of the heating element 42 as well as the load and it is practical to attain actuation in an interval of less than one second. With a heater element of approximately 500 watts, it is possible to obtain approximately 30 pounds of force from the actuator 24 over the full stroke of the plunger. Further, cooling of the actuator 24 is significantly assisted by the heat-sink action of the adapter plate 78 and the latch mechanism 20 so that repeatable action is possible in a short interval suitable for most applications.

In the preferred embodiment of the invention, biasing of the plunger 40 to the left is effected by torsion spring 68 and in designing such mechanism spring characteristics are selected both to accommodate manual actuation of the mechanism as well as the operating characteristics of the actuator 24. Thus, for example, utilizing Freon 113 as the fluid 32 in order to obtain fast response characteristics and operation at low internal pressure, presents a condition where some force output is realized at elevated environmental temperatures since the actuator 24 is a form of heat motor having a fairly well established pressure-temperature relationship. Spring 68 could be designed to present sufficient force to prevent movement of the plunger 40 at low levels of force output of the actuator 24 to prevent actuation of the latch mechanism. Similar design considerations can be accommodated by the use and type selection for compression spring 48, self-contained within the actuator 24 either solely or in combination with an external force effect, as by spring 68, the latter technique involving consideration for the combined effects of the two springs throughout the stroke of the plunger 40.

I therefore particularly point out and distinctly claim as my invention:

1. In combination with an actuatable vehicular device, means for electrically actuating said device from the power source of the vehicle, comprising a cylindrical container having a closed end, an annularly folded flexible diaphragm in sealed engagement with said container to define, in the folded condition, a sealed chamber, liquid Freon substantially filling said chamber and adapted to be vaporized to distend said diaphragm, a coil of resistance wire in said chamber for heating said Freon to cause vaporization thereof, one end of said coil being in electrical and supportive connection with said container thereby forming one lead for energizing said coil, a second lead insulatively penetrating the closed end of said container for electrical and supportive connection of the center of said coil, means for connecting said first and second leads to the power source of the vehicle for energization of said coil, and a plunger slidably mounted in said container for movement with said diaphragm, said plunger being adapted for actuation of said vehicular device.

2. The combination set forth in claim 1 further including a return spring mounted between said container and said plunger for urging the latter into engagement with said diaphragm.

3. The combination set forth in claim 1 wherein said vehicular device is manually operable and includes said return spring therein, said plunger being operatively connected with said return spring and said diaphragm.

4. The combination set forth in claim 3 wherein said vehicular device is a latch mechanism comprising a latch member adapted for engagement with a keeper, and a catch member for retaining said latch member in such engagement, said catch member being movable between engaged and disengaged relation with said latch member, said return spring biasing said catch member into engagement with said latch member, and said plunger being operatively connected to cause disengagement of said catch means.

5. The combination set forth in claim 1 wherein said Freon is Freon 113 having a vaporization temperature at one atmosphere of approximately 118° F.

6. The combination set forth in claim 2 wherein said Freon is Freon 113 having a vaporization temperature of approximately 118° F. and said return spring has sufficient force to prevent substantial movement of said diaphragm below approximately 180° F.

References Cited
UNITED STATES PATENTS

| | | | |
|---|---|---|---|
| 3,113,447 | 12/1963 | Oishei | 292—201 X |
| 3,256,686 | 6/1966 | Lindberg, Jr. | 60—23 X |
| 2,572,386 | 10/1951 | Ray | 60—23 X |

OTHER REFERENCES

Instrument Society of America, 60/23.
Conference Preprint #83–59, Sept. 21–25, 1959.

RICHARD E. MOORE, Primary Examiner

U.S. Cl. X.R.

292—216, digest 66; 60—23